US006960673B2

(12) United States Patent
Brunner et al.

(10) Patent No.: US 6,960,673 B2
(45) Date of Patent: Nov. 1, 2005

(54) METHOD FOR PRETREATING CRUDE OILS AND RAW FATS FOR THE PRODUCTION OF FATTY ACID ESTERS

(75) Inventors: Karlheinz Brunner, Grosskrotzenburg (DE); Rainer Frische, Frankfurt (DE); Rainer Ricker, Dietzenbach (DE)

(73) Assignee: Westfalia Separator AG, Oelde (DE)

( * ) Notice: Subject to any disclaimer, the term of this patent is extended or adjusted under 35 U.S.C. 154(b) by 13 days.

(21) Appl. No.: 10/433,446

(22) PCT Filed: Nov. 29, 2001

(86) PCT No.: PCT/EP01/13956

§ 371 (c)(1),
(2), (4) Date: Jun. 3, 2003

(87) PCT Pub. No.: WO02/46339

PCT Pub. Date: Jun. 13, 2002

(65) Prior Publication Data

US 2004/0054206 A1 Mar. 18, 2004

(30) Foreign Application Priority Data

Dec. 4, 2000 (DE) ................................ 100 60 329
Dec. 20, 2000 (DE) ................................ 100 63 967
Aug. 17, 2001 (DE) ................................ 101 39 422

(51) Int. Cl.[7] ................................................ C11B 3/04

(52) U.S. Cl. ...................................... 554/174; 554/167

(58) Field of Search ................................ 554/167, 174

(56) References Cited

U.S. PATENT DOCUMENTS

| | | | | |
|---|---|---|---|---|
| 2,383,601 | A * | 8/1945 | Keim | 554/167 |
| 2,415,140 | A | 2/1947 | Liebscher | 260/425 |
| 4,164,506 | A * | 8/1979 | Kawahara et al. | 554/167 |
| 6,013,817 | A | 1/2000 | Stern et al. | 554/167 |

FOREIGN PATENT DOCUMENTS

| | | |
|---|---|---|
| DE | 33 19 590 | 12/1984 |
| DE | 42 28 476 | 3/1994 |
| DE | 43 01 686 | 3/1994 |
| DE | 196 20 523 | 4/1997 |
| EP | 0 127 104 | 5/1984 |
| EP | 0 131 991 | 1/1985 |
| EP | 0 192 035 | 1/1986 |
| WO | 00/75098 | 12/2000 |

OTHER PUBLICATIONS

International Search Report issued in connection with PCT/EP01/13957 under date of mailing of May 17, 2002.
Standard Search RS 107395 issued on Oct. 31, 2001.

* cited by examiner

*Primary Examiner*—Deborah D. Carr
(74) *Attorney, Agent, or Firm*—Quarles & Brady LLP

(57) ABSTRACT

A method for pretreating crude oils and fats for subsequent alkaline transesterification with primary and/or secondary alcohols. The raw oil or fat loaded with slimy substances is treated with a mixture used at 0.15 wt. % in relation to the oil or fat comprising an alcohol and concentrated acid, and preferably is subsequently rinsed with an alkaline glycerol phase arising from an alkaline transesterification reaction of the above-mentioned type. After the rinsing process, the glycerol phase which is loaded with slimy substances and soaps of free fatty acids is separated as a heavy phase of neutral oil liberated from free fatty acids.

25 Claims, 2 Drawing Sheets

Figure 1:
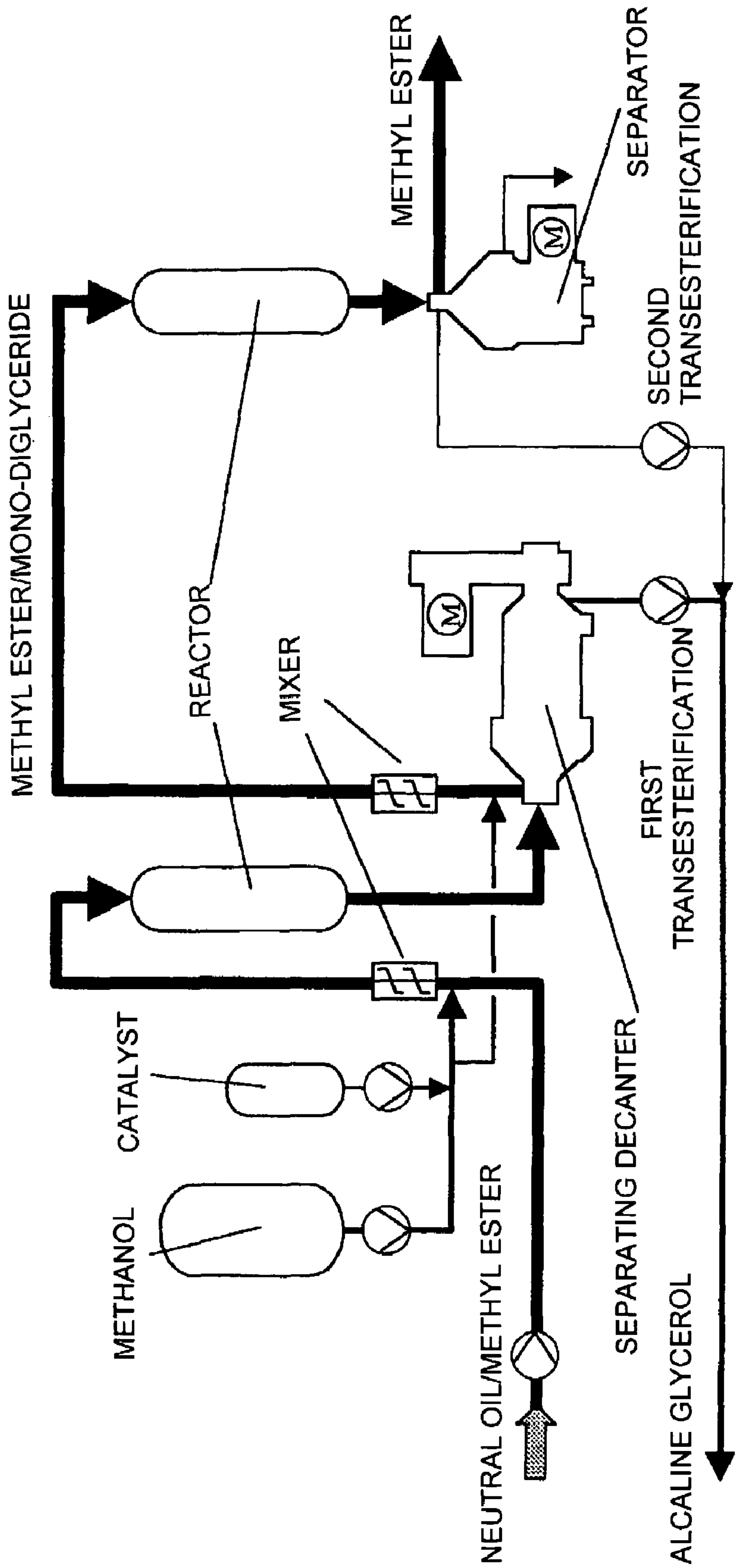

METHOD FOR PRETREATING CRUDE OILS AND RAW FATS FOR THE PRODUCTION OF FATTY ACID ESTERS

The present invention relates to a method for pretreating crude oils and raw fats for the production of fatty acid esters by transesterification of oils and fats to so-called bio-diesel such as RME (rape methyl ester).

Bio-diesel production is based on the alkaline-catalyzed transesterification reaction applied in oleo chemistry, wherein glycerol fatty acid esters in form of mono-, di- or tri-esters almost completely react with an alkali hydroxide or an alkali alcoholate in the presence of amounts of primary alcohols (in excess of 10% to 50%) slightly higher than stoichiometric amounts and at an increased temperature of approximately 30° to 60° C., to the fatty acids of the primary or secondary short-chain alcohol (chain length from C1 to C4) while splitting off and separating glycerol.

The content of free fatty acids in oils and fats, as generally known, substantially disturbs the transesterification reaction. A correspondingly large number of papers dealing with the problem of the free fatty acids exist.

In U.S. Pat. No. 2,415,140 A, treatment of the crude oil (having for instance a content of 1.6% of free fatty acids) is effected by means of a raffinate solution of glycerol dissolved in NaOH whereupon the oil phase freed in this manner from free fatty acids is centrifugally separated.

In U.S. Pat. No. 2,383,601 A, oils having very large amounts of free fatty acids (between 10 and 50%) are treated so that alkaline-catalyzed transesterification becomes possible. To this end, acidic-catalyzed preesterification of the free fatty acids with methanol and concentrated sulphuric acid at increased temperature is performed prior to the transesterification. The alcohol is preferably added over-stoichiometrically at an excess of at least more than 50% relative to the stoichiometric amount for transesterification of free fatty acids. In one embodiment of the process, the mixture pre-esterified at 60° C. is washed with water, is dried over sodium sulphate and is filtered before alkaline transesterification takes place. In one embodiment of the process where acidic preesterification and alkaline transesterification take place immediately one after the other, ethanol and sodium ethylate are added directly after preesterification and the reaction mixture is transesterified at 130° C. and under pressure in order to keep the ethanol in liquid form. After distilling off excessive ethanol, the reaction product is transferred into an acidification tank, is dried and distilled. Without such additional acidification, it is not possible in this case to separate a glycerol phase. In U.S. Pat. No. 4,164,506, large amounts of methanol both serving for preesterification of free fatty acids and as entrainer (carrier) are added. After the preesterification reaction, the oil phase freed from the free fatty acids is separated from the alcohol phase which contains impurities solved therein and the acidic catalyst. A sufficient separation effect can, however, only be obtained if considerable amounts of methanol are used. The purified oil phase obtained in this manner is subjected to an alkaline-catalyzed transesterification. DE 33 19 590 A uses an entraining medium in an acid-catalytic esterification of free fatty acids as well. In order to be able to reduce the alcohol amount, glycerol was used as entrainer in EP 0 127 104 B1, and acidic preesterification of the free fatty acids was performed in the presence of water-free acidic glycerol and in the presence of alcohol. The purpose of adding water-free acidic glycerol is to provide a catalyst and to bind reaction water that has formed and to remove it on being separated (entrainer). In this case, too, the glycerol may, together with the acidic catalyst, be cycled in a circulation process after having removed the alcohol and the reaction water by distillation. EP 0192 035 proposes as an alternative to use solid cation exchange resins in acidic form. Here, the reaction water is to be removed after having separated the reaction mixture from the exchange resin. For acidic preesterification, DE 42 28 476 A works with a strongly acidic ion exchanger in a fixed bed reactor. In DE 43 01 686 C the ester phase is washed with glycerol, raw glycerol or glycerol phase from a preceding transesterification stage after transesterification in order to avoid wash and process water, and is subjected to a two-stage transesterification. U.S. Pat. No. 6,013,817 A discloses an elaborate multi-stage alkaline transesterification process, wherein glycerol phase, too, is added to the transesterification product before the glycerol and ester phases are separated. Distilled-off alcohol is fed back to the process. The separated glycerol phase is neutralized with acid, and an organic phase having fatty acids and esters and again a glycerol phase which is subsequently used for transesterification of this organic phase are separated.

In EP 0 131 991 A and WO 00 75098 A, on the other hand, the alkaline glycerol phase from the transesterification already performed is used for pretreatment of a crude oil in order to extract the free fatty acids from the starting oil and to separate them together with other harmful accompanying substances such as phosphatides from the starting oil. The fatty acids are neutralized in the process by using the catalyst having been employed already for transesterification.

The inventors of the present application, however, recognized that while the free fatty acids can be removed in an economic manner by this procedure, a higher amount of phosphorus, in general, cannot be lowered below the limit value permissible for bio-diesel.

Crude pressed or solvent extraction oils and fats always contain slimy substances or gums which form oil/water emulsions which can only hardly be destroyed. These are essentially water-swellable slimy or mucilaginous substances, e.g. lecithin (phosphatides) and slimy substances not swellable in water in form of other phosphorus-containing compounds. In this manner, clean phase separation, for example between glycerol and formed fatty acid ester is prevented. Moreover, washing of the generated fatty acid ester with water, which is necessary for removal of glycerol ester, is obstructed by the emulsions.

Considering that phosphorus is allowed to be present in bio-diesel only in very small amounts any way and that the transesterification reaction alone does not reliably remove too large residual phosphorus amounts, it is preferred in practice that both "chemical" wet and "physical" dry deacidification of the crude starting oils be preceded by elaborate desliming. The oil is intensively hot-mixed, for example with phosphoric acid of 75% to 85% added in an amount of about 0.05 wt. % to 0.1 wt. % relative to the oil, and after an extended dwelling period it is subsequently washed with aqueous alkaline solution. In the so-called degumming process, the slimy substances present in the oil in dissolved form and, therefore, not separable by sedimentation, are transferred either together with water (water desliming or degumming) or with aqueous acid (acidic desliming or degumming) into hydrated slimy substances which are not soluble in oil and, therefore separable as precipitate. In separating the substances, however, neutral oil is always entrained as well and, therefore, will not take part in subsequent transesterification.

In case of hot pressed oils and for example oils extracted by means of hexane, such measures are generally indispensable. In hot pressing/extraction, as is known, the yield of oil is higher, however affected by the disadvantage that in this case the slimy substance content is significantly higher than in case of cold pressed oil.

It is the object of the present invention to provide a pretreatment method by which oils and fats which contain slimy substances can, cost-efficient and nevertheless effectively, be treated for subsequent alkaline-catalyzed transesterification.

This object is solved by the subject matter of claim 1. Preferred further developments are characterized in the subclaims.

Moreover, the present invention also concerns the subject matter of a method for producing fatty acid esters of primary and/or secondary alcohols from raw unpurified oils or fats containing free fatty acids and slimy substances or from waste oils of the food industry loaded with free fatty acids, in which method a pretreatment of the oil or fat is performed in accordance with claims 1 and 2, wherein the alkaline glycerol is returned or recycled from a subsequent transesterification stage into the process according to claim 2.

Desliming according to claim 1 of the present invention, in contrast to prior acidic catalyzed preesterifications of free fatty acids, can be completely effected even cold at room temperature in a very short period of time with comparable amounts of phosphoric acid or sulphuric acid if the added acid is supplemented with approximately the same amount of a short-chain alcohol (primary or secondary alcohol, in regular case up to C4), particularly methanol. The short-chain alcohol is a commercial water-free alcohol. Swelling or conditioning, respectively, of the slimy substances occurs very rapidly during homogenization of the mixture, for example in a mixer. Fatty acid methyl ester produced by alkaline catalyzed transesterification starting from crude rape oil having a starting phosphorus content of 175 mg phosphorus per kg of oil and being pretreated in the above manner within only 15 minutes contains less than 1 mg phosphorus/kg oil, a value only hardly achieved according to the prior art even when starting from refined oil.

Separation of the slimy substances can be performed either by decantation or filtration. In accordance with the present invention, the slimy substances are preferably separated by centrifugation.

It is surprising that, in comparison to degumming, where separation of the slimy substances occurs by means of an acid only in the presence of water, such significant effect on the slimy substances is achieved by the small amount of added alcohol. By means of this alcohol addition according to the invention, the slimy substances are transferred, by swelling, into a form non-soluble in oil and, in this manner, are rendered precipitable. In transfer of the alcohol from the added acidic alcoholic phase into the oil phase, moreover, at least slight traces of the added acid get into the oil as well, where these acid traces obviously make possible the precipitation of the slimy substances being only acidically precipitable.

In accordance with the invention, concentrated acid is used which contains no water or only little water. In case of preferably employed phosphoric acid, the method is performed with a commercial acid of 75% to 85% concentration. In case of sulphuric acid, acid of 100% concentration may be used. In principle, a less than 70% concentrated aqueous acid is not used. Further dilution of the acid occurs only through the alcohol added.

The mixture of concentrated acid and the alcohol is used in an amount of 0.1 wt. % to 5 wt. %, preferably up to 2 wt. % relative to the added oil or fat. Depending on the quality of the oil or the fat and the concentration of the acid, the acid to alcohol weight ratio in this mixture is adjusted to values between 2:1 and 1:5, preferably 1:1 to 1:2. At a preferred value of the added mixture of for example 1 wt. % relative to the oil or the fat, the acid fraction therefore amounts to between 0.66 wt. % and 0.2 wt. %.

The oil treated according to claim 1 again may be rinsed or washed at room temperature in accordance with claim 2 in order to lower again the content of free fatty acids prior to transesterification and to separate, at the same time, the slimy substances. It is self-evident that the method according to claim 1 can also be applied to oils and fats which are free of free fatty acids or contain only very little free fatty acids. In that case, one can refrain from performing said washing and can separate the slimy substances directly by centrifugation. If, however, the oil or the fat contains considerable amounts of alkalinely attackable slimy substances, subsequent washing with glycerol phase is recommended.

Subsequently, the free fatty acids and the acidic catalyst in the oils and fats pretreated according to claim 1 for desliming are removed by washing in an alkaline glycerol phase derived from an alkaline-catalyzed transesterification process of an oil or fat and, therefore, available anyway and not causing any additional expenses. Preferably, this is a transesterification process immediately following pretreatment according to the invention. The alkaline or basic glycerol phase is a water free glycerol phase containing residual alcohol (mostly residual methanol), soaps and residual alkaline catalyst. The residual alcohol content (residual methanol content) in the glycerol enables, notwithstanding the high viscosity of the oil and the glycerol, very rapid neutralization and separation of the produced soaps.

Complete separation of the glycerol wash phase, for example by means of polishing centrifuges is not necessary. It was even revealed that 1 to 5 wt. % of the initial glycerol phase remaining, in case of simple centrifugal separation, for example performed in a separation decanter, as micro drops in the separated oil phase, will even accelerate subsequent alkaline-catalyzed transesterification with methanol (or other primary or secondary short-chain alcohol) and suppress saponification of the oil which takes place in parallel.

Washing or rinsing of the oil may occur at room temperature, where a short contact of the glycerol phase may take place for example in a dynamic mixer or a static mixer and a direct separation of the phases may take place in a subsequent separator. In the dynamic mixer, the liquids to be mixed and not soluble in one another are intensively mixed with one another by dividing them into small drops. According to a preferred embodiment, both mixing and separation are performed in an extraction decanter, i.e. a solid wall bowl centrifuge wherein the glycerol phase may particularly well be separated from the remaining liquid phase.

When washing the oil or the fat, respectively, certain alkaline desliming takes place where, eventually, portions of phosphorus-containing oil accompanying substances are removed as well. Entraining of neutral oil with the soap according to common saponification with aqueous alkaline solution does not take place in the washing step with alkaline glycerol according to the invention. This constitutes a substantial advantage for subsequent treatment of the soaps to get free fatty acids.

Figure 2:
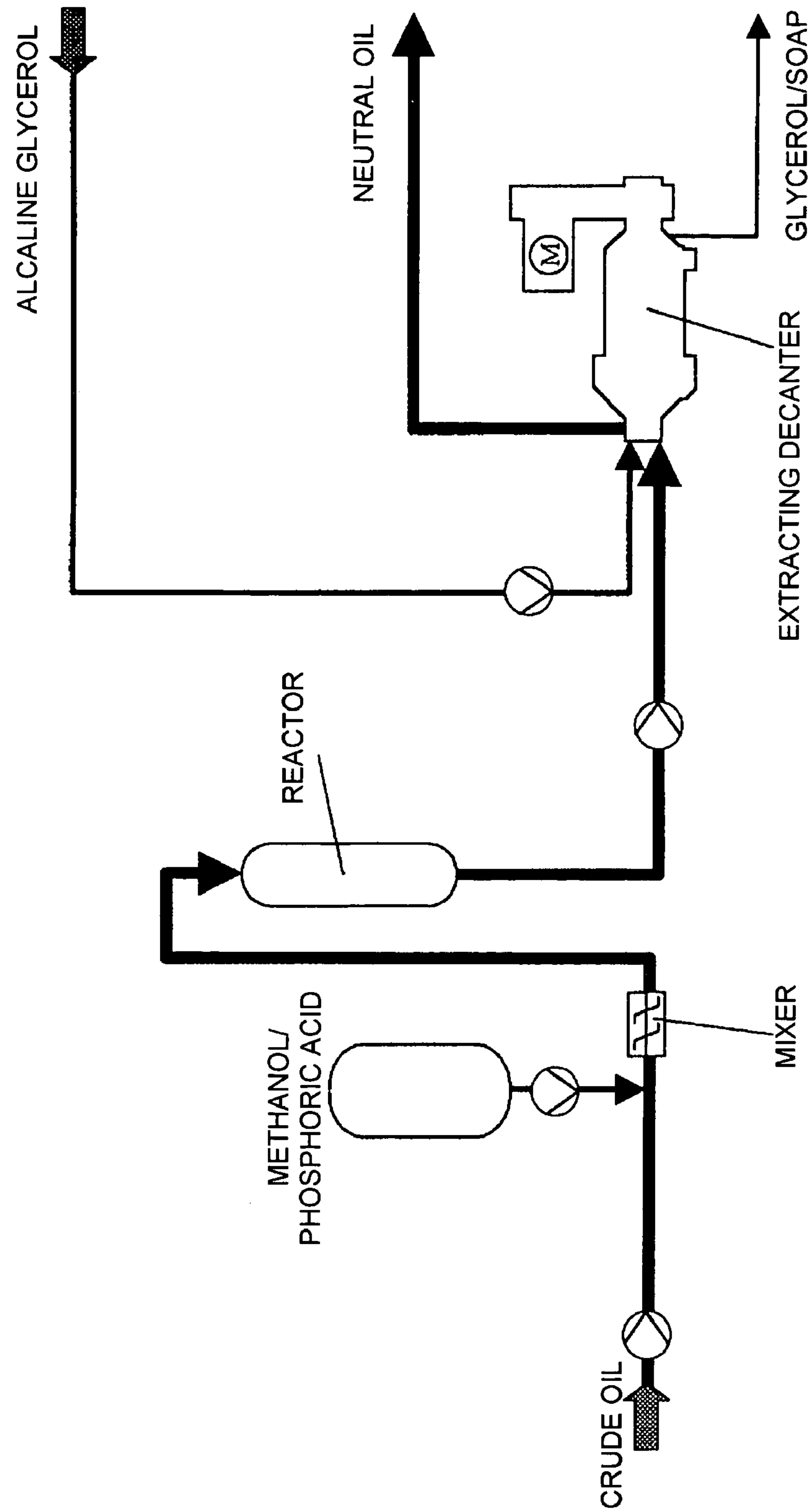

In the following, the invention will be explained in more detail referring to the drawings wherein FIG. 1 diagrammatically shows a possible alkaline transesterification process to which pretreatment according to the invention of the oil or fat is applied and the alkaline glycerol of which resulting from transesterification may be used in a further development of the pretreatment according to the invention, and FIG. 2 diagrammatically shows an acidic desliming process according to the invention with preferred subsequent washing with alkaline glycerol.

The invention will be described for crude oils (not refined, i.e. neither deslimed nor deacidified) but may be applied to raw fats brought into a liquid form as well.

According to FIG. 1, alkaline transesterification with methanol, as an example for a preferably employed alcohol is performed in two steps or stages wherein, following a first transesterification stage, the methyl ester and still-present mono- and diglycerides are separated from the alkaline glycerol by means of a separating decanter (solid wall bowl centrifuge). Separation into methyl ester and alkaline glycerol is performed after a second transesterification step, for example, in a separator including a disk package (stack centrifuge).

In FIG. 1 it is indicated that alkaline glycerol having been centrifugally separated is discharged as heavy phase from the first as well as the second transesterification stage. Said discharged alkaline glycerol having residual amounts of methanol and catalyst (for example 20 wt. % of methanol and 15 wt. % of KOH) is charged, together with the crude oil having been subjected to said acidic desliming, into an extraction decanter (solid wall bowl centrifuge having two inlets for the liquid crude oil phase and the viscous liquid alkaline glycerol phase). In the decanter, an intimate mixing and separation is effected in that, on entry of the glycerol phase of higher specific weight into the rotating decanter drum, this phase is intensively mixed with the oil phase of less specific weight and in that the separately charged oil phase intensively mixes at its entry with the pre-charged glycerol phase. Immediately following intensive mixing of the two phases, phase separation takes place in the centrifugal field. Deslimed neutral oil freed from fatty acids is discharged as light phase from the decanter. A glycerol phase loaded with soaps and slimy substances precipitates as heavy phase.

Alcohol (methanol or another short-chain alcohol) may be added to the glycerol to improve the washing effect.

Instead of a preferred extraction decanter, a separator (disk centrifuge) having a premixing stage may be used as well.

The disclosed pretreatment of the oil by means of acid and alcohol for removing slimy substances may also be advantageously applied to edible fats considering that, on one hand, the added alcohol amount does not constitute a perceivable cost factor and, on the other hand, the alcohol is completely removed in the ordinary refining or conditioning process anyway.

The temperature of the treatment according to the invention, as already mentioned, may be low in contrast to the prior art hot processes. It is preferred to operate at normal pressure between 20° C. and 40° C. to 50° C., in exceptional cases up to 60 or 70° C. At room temperature, successful pretreatment could be performed in less than 30 minutes. At higher temperatures, this time period becomes correspondingly shorter. The time periods are substantially higher when using an acidic preesterification.

In this manner, it is possible to work in a temperature range which is optimum for alkaline transesterification which in many cases takes place below 50° C. Therefore, no cooling measure is necessary between pretreatment stage and transesterification stage.

EXAMPLE

A batch of crude rape oil (174 ppm phosphorus, acid number 2.5) of approximately 55 kg was mixed in a receiver (volume 80 liters) with 275 g of a mixture of 160 g of 85% phosphoric acid and 115 g of water free methanol and circulated for intensive mixing by a chemical rotary pump for 15 minutes at room temperature (25 to 30° C.).

At the beginning, the mixture became cloudy when circulated by the pump but became clear after about 5 minutes. After switching off the circulating pump and the mixer and during discharge of the mixture, large dark brown flocs could be observed precipitating from the oil.

The crude oil so pretreated was subsequently fed, in free-fall vertical motion, together with about 10 wt. % of alkaline glycerol originating from an alkaline transesterification via a mixing stage (consisting of a further stirring vessel having an effective volume of approximately 300 ml) before the centrifuge inlet directly into a centrifuge (SA 1-0 1, Westfalia Separator AG, Oelde, Germany) and was continuously separated. The intake rate amounted to about 13 kg/h of oil and about 1.3 kg/h of glycerol.

The neutral oil discharged was still slightly cloudy and was, therefore, post-polished by means of a disk type centrifugal separator (TA 1-0 1, Westfalia Separator AG, Oelde, Germany) (not shown).

Subsequent acidic splitting or cleavage of the soap solved in glycerol yielded the fatty acid amount of the free fatty acids which before were contained in the crude oil. To this purpose, the fatty acid amounts in the glycerol, which can be liberated by acid were determined before and after washing and compared. Hence, it was guaranteed that no neutral oil saponification had taken place during the above pretreatment.

The deslimed neutral oil so obtained was subsequently transesterified in a common manner, alkalinely (with KOH) by adding methanol. The phosphorus content of the methyl ester so obtained was below 1 ppm.

Further experiments with larger amounts were also performed by using separation decanters according to the figures. This is recommendable in cases where the crude oil is additionally strongly contaminated by solid impurities.

What is claimed is:

1. Method for pretreating crude oils and fats characterized in that the crude oil or fat loaded with slimy substances is treated with a mixture used at 0.1 wt. % to 5 wt. % in relation to the oil or fat and containing an alcohol and concentrated acid and that said slimy substances swelled and being no longer oil-soluble or fat-soluble due to the treatment are subsequently separated.

2. Method for pretreating crude oils and fats characterized in that the crude oil or fat loaded with slimy substances is treated with a mixture used at 0.1 wt. % to 5 wt. % in relation to the oil or fat and containing an alcohol and concentrated acid and that said slimy substances swelled and being no longer oil-soluble or fat-soluble due to the treatment are subsequently separated, wherein the treated oil or fat is washed for separating said slimy substances and free fatty acids with an alkaline glycerol phase originating from an alkaline transesterification reaction of the kind referred to, and that, after said washing process, the glycerol phase now loaded with soaps of the free fatty acids and slimy substances is separated as heavy phase from the neutral oil.

3. Method according to claim 1, characterized in that the treatment of the oil or the fat is performed between room temperature and 50° C.

4. Method according to claim 2, characterized in that washing and separating are performed centrifugally.

5. Method according to claim 4, characterized in that washing and separating are performed by means of a continuously operating centrifuge, particularly in an extraction decanter.

6. Method according to claim 1, characterized in that the acid is selected from the group consisting of phosphoric acid, sulphuric acid and p-toluene sulphonic acid.

7. Method according to claim 1, characterized in that said slimy substances are centrifugally separated.

8. Method according to claim 1, characterized in that the alcohol is selected from the group of short-chain primary and secondary alcohols, particularly methanol, ethanol, propanol, butanol, isopropanol and isobutanol.

9. Method according to claim 1, characterized in that the treatment in the mixture of alcohol and acid diluted therein is performed in a centrifugal mixer and subsequently in a container for dwelling.

10. Method according to claim 1, characterized in that the acid has a concentration of at least 70% and that the acid to alcohol weight ratio in the mixture, depending on the acid concentration and the quality of the oil or the fat, is adjusted to between 2:1 and 1:5.

11. Method for producing fatty acid esters of primary and/or secondary alcohols from oils or fats containing crude free fatty acids and slimy substances or from waste oils loaded with free fatty acids from the food industry, by an alkaline transesterification with said primary and/or secondary alcohols, characterized in that a pretreatment of the oil or the fat is performed prior to said transesterification in that the crude oil or fat loaded with slimy substances is treated with a mixture used at 0.1 wt. % to 5 wt. % in relation to the oil or fat and containing an alcohol and concentrated acid and that said slimy substances swelled and being no longer oil-soluble or fat-soluble due to the treatment are subsequently separated and that the pretreated oil or fat is washed for separating said slimy substances and free fatty acids with an alkaline glycerol phase originating from and being recycled from a subsequent alkaline transesterification reaction into the process, and that, after said washing process, the glycerol phase now loaded with soaps of the free fatty acids and slimy substances is separated as heavy phase from the neutral oil.

12. Method according to claim 11, characterized in that further pretreatment is performed between room temperature and 50° C.

13. Method according to claim 11, characterized in that the washing and separating are performed centrifugally.

14. Method according to claim 11, characterized in that the washing and separating are performed by means of a continuously operating centrifuge, particularly in an extraction decanter.

15. Method according to claim 11, characterized in that the acid is selected from the group consisting of phosphoric acid, sulphuric acid and p-toluene sulphonic acid.

16. Method according to claim 11, characterized in that said slimy substances and the glycerol loaded with soaps and slimy substances, respectively, are centrifugally separated.

17. Method according to claim 11, characterized in that the alcohol is selected from the group of short-chain primary and secondary alcohols, particularly methanol, ethanol, propanol, butanol, isopropanol and isobutanol.

18. Method according to claim 11, characterized in that the treatment in the mixture of alcohol and acid diluted therein is performed in a centrifugal mixer and subsequently in a container for dwelling.

19. Method according to claim 11, characterized in that the acid has a concentration of at least 70% and that the acid to alcohol weight ratio in the mixture, depending on the acid concentration and the quality of the oil or the fat, is adjusted to between 2:1 and 1:5.

20. Method according to claim 2, characterized in that said glycerol phase loaded with soaps and slimy substances is centrifugally separated.

21. Method according to claim 1, characterized in that said mixture contains substantially equal amounts of alcohol and concentrated acid, and the acid to alcohol weight ratio in the mixture is adjusted to between 2:1 and 1:5.

22. Method for pretreating crude oils and fats loaded with slimy substances, said method comprising:

treating an oil or fat loaded with slimy substances with a 0.1 wt % to 5 wt. % mixture of alcohol and concentrated acid to swell said slimy substances such that said swelled slimy substances are substantially oil or fat insoluble, said mixture containing substantially equal amounts of alcohol and concentrated acid; and separating said swelled slimy substances from said oil or fat.

23. Method according to claim 22, characterized in that the acid to alcohol weight ratio in the mixture is adjusted to between 2:1 and 1:5.

24. Method for producing fatty acid esters of primary and/or secondary alcohols from oils or fats containing crude free fatty acids and slimy substances or from waste oils loaded with free fatty acids from the food industry, by an alkaline transesterification with said primary and/or secondary alcohols, said method comprising:

pretreating oil or fat loaded with slimy substances with a mixture containing an alcohol and concentrated acid to swell said slimy substances such that said swelled slimy substances are substantially oil or fat insoluble, said mixture containing substantially equal amounts of alcohol and concentrated acid;

separating said swelled slimy substances from said oil or fat;

washing said slimy substances and free fatty acids with an alkaline glycerol phase originating from and being recycled from a subsequent alkaline transesterification reaction into the process; and separating said glycerol phase now loaded with soaps of the free fatty acids and slimy substances from said free fatty acids and slimy substances.

25. Method for pretreating crude oils and fats characterized in that the crude oil or fat loaded with slimy substances is treated with a mixture used at 0.1 wt. % to 5 wt. % in relation to the oil or fat and containing an alcohol and concentrated acid and that said slimy substances swelled and being no longer oil-soluble or fat-soluble due to the treatment are subsequently separated by centrifugation.

* * * * *